(12) United States Patent
Sato et al.

(10) Patent No.: US 6,303,403 B1
(45) Date of Patent: Oct. 16, 2001

(54) METHOD FOR PREPARING GALLIUM NITRIDE PHOSPHOR

(75) Inventors: Yoshitaka Sato; Yoriko Suda; Fumiaki Kataoka; Hitoshi Toki; Yuji Nomura, all of Mobara (JP)

(73) Assignee: Futaba Denshi Kogyo, K.K., Chiba-ken (JP)

( * ) Notice: Subject to any disclaimer, the term of this patent is extended or adjusted under 35 U.S.C. 154(b) by 0 days.

(21) Appl. No.: 09/472,011

(22) Filed: Dec. 27, 1999

(30) Foreign Application Priority Data

Dec. 28, 1998 (JP) .................................................. 10-373538
Dec. 28, 1998 (JP) .................................................. 10-373539

(51) Int. Cl.[7] .............................. H01L 21/00; C09K 11/06
(52) U.S. Cl. ............................ 438/29; 438/505; 438/935; 252/301.16; 252/301.32; 252/301.4 P
(58) Field of Search .................................. 438/29, 46, 95, 438/504, 505, 763, 767, 935; 252/301.32, 301.16, 301.4 P

(56) References Cited

U.S. PATENT DOCUMENTS

| | | | |
|---|---|---|---|
| 3,205,102 | * 9/1965 | McCaldin | 148/189 |
| 3,578,495 | * 5/1971 | Pammer | 117/201 |
| 3,594,242 | * 7/1971 | Burd et al. | 148/175 |
| 3,660,179 | * 5/1972 | Desmond et al. | 148/189 |
| 3,716,405 | * 2/1973 | Lim | 117/201 |
| 3,725,749 | * 4/1973 | Groves et al. | 317/234 R |
| 3,729,341 | * 4/1973 | Dietz et al. | 117/201 |
| 3,829,556 | * 8/1974 | Logan et al. | 423/409 |
| 3,870,575 | * 3/1975 | Dosen | 148/171 |
| 3,893,875 | * 7/1975 | Watanabe et al. | 148/172 |
| 4,144,116 | * 3/1979 | Jacob et al. | 156/611 |
| 4,190,470 | * 2/1980 | Walline | 148/175 |
| 4,217,154 | * 8/1980 | Popp et al. | 148/189 |
| 5,858,278 | * 1/1999 | Itoh et al. | 252/301.4 R |

\* cited by examiner

*Primary Examiner*—Matthew Smith
*Assistant Examiner*—Lex H. Malsawma
(74) *Attorney, Agent, or Firm*—Breiner & Breiner, L.L.C.

(57) ABSTRACT

A method for preparing a gallium nitride phosphor which is capable of emitting light at luminance increased to a degree sufficient to permit the phosphor to be practically used. A dopant compound containing elements reacted with $H_2$ and gasified by heating is arranged on an upstream side in a calcination oven in which $NH_3$ is flowed and a matrix element compound is arranged on the downstream side therein, resulting in calcination of the compound being carried out. This permits GaN to be surrounded with ammonia and the dopant during the calcination, so that the GaN phosphor may be fully doped with the dopant.

10 Claims, 4 Drawing Sheets

METHOD FOR PREPARING GALLIUM NITRIDE PHOSPHOR

BACKGROUND OF THE INVENTION

This invention relates to a method for preparing a gallium nitride phosphor, and more particularly to a method for preparing a $Ga_{1-x}In_xN$:A,B ($0 \leq x < 1$, A=Zn,Mg, B=Si,Ge) phosphor.

In recent years, it has been known that gallium nitride (hereinafter generally referred also to as "GaN") emits blue and green light at high luminance when it is incorporated in the form of a single crystal in a luminescent device such as an LED, an LD or the like. Also, it emits light in a wide luminous color range extending from a blue luminous color to a red luminous color when it is represented by a general formula $Ga_{1-x}In_xN$:A,B ($0 \leq x < 1$, A=Zn,Mg, B=Si,Ge)

Preparation of a GaN phosphor which has been conventionally known in the art is carried out by blending a Ga compound acting as a starting material with a compound for a dopant (dopant compound) to prepare a blend and then placing the blend in a calcination oven to subject it to calcination at a high temperature while exposing it to ammonia flowed in the oven, to thereby nitride Ga and dope it with the dopant.

In the past, it has been attempted to carry out luminescence of the thus-prepared GaN phosphor by means of electron beams. However, the prior art fails to permit the phosphor to emit light at increased luminance when it is in the form of a powder.

The major reason why the phosphor fails to exhibit increased luminance is that nitriding of the GaN phosphor is hard, unlike other phosphors. More particularly, the GaN phosphor causes a difference between a temperature at which it is nitrided (700 to 1000° C.) and a temperature at which it starts to be composed (950° C.) to be reduced, so that normal heating of the phosphor for reaction thereof tends to cause nitriding and decomposition of the phosphor to concurrently progress. Thus, although the reaction leads to formation of GaN, the GaN obtained fails to exhibit crystallizability sufficient to permit it to satisfactorily act as a phosphor intended.

Also, the GaN phosphor exhibits pair-luminescence by a combination of a donor increased in valence by one as compared with Ga and an acceptor decreased in valence by one as compared with Ga, so that it is required to dope GaN with a dopant for each of the donor and acceptor. Doping of the dopant requires a significantly increased temperature. However, GaN tends to be decomposed at such a high temperature, resulting in failing in an increase in temperature, leading to a failure in satisfactory doping.

Further, preparation of a nitride such as GaN is generally carried out by subjecting a starting material or Ga compound to calcination at a high temperature in an atmosphere using ammonia, during which hydrogen produced by decomposition of ammonia exhibits a reducing action to a high degree. The reducing action causes GaN to be reduced, resulting in Ga being liberated from GaN, leading to blackening of the phosphor. Such blackening of the phosphor gives rise to a fatal disadvantage because it causes the phosphor to absorb its own luminescence, resulting in the phosphor being reduced in luminance. Also, the reducing action causes decomposition and scattering of the dopant incorporated in the GaN, leading to a failure in satisfactory diffusion of the dopant. In order to eliminate such disadvantages due to the reducing action of hydrogen, it is required to carry out the reaction at a low temperature. However, this fails to dope GaN with the dopant. Thus, the prior art fails to provide a GaN phosphor which is capable of emitting light at increased luminance.

SUMMARY OF THE INVENTION

The present invention has been made in view of the foregoing disadvantage of the prior art.

Accordingly, it is an object of the present invention to provide a method for preparing a gallium nitride phosphor which is capable of emitting light at luminance increased to a degree sufficient to permit the phosphor to be practically used.

It is another object of the present invention to provide a gallium nitride phosphor which is capable of being prevented from being blackened due to calcination at a temperature increased to a level sufficient to improve crystallizability of the phosphor.

In accordance with the present invention, a method for preparing a gallium nitride phosphor represented by a formula $Ga_{1-x}In_xN$:A,B ($0 \leq x < 1$, A=Zn,Mg, B=Si,Ge) is provided. The method includes the step of reacting S or O with hydrogen of ammonia gas flowed from an upstream side to a downstream side in a calcination oven in which a compound constituting the phosphor is placed. The S or O is generated upstream of the compound. The method also includes the step of subjecting the compound to calcination in an atmosphere containing nitrogen and S or O to nitride gallium and dope the compound with the A and B of the formula.

In a preferred embodiment of the present invention, a material for generating the S or O is a compound containing the A, which is placed upstream of the compound constituting the phosphor to nitride it by calcination.

In a preferred embodiment of the present invention, the compound containing the A is selected from the group consisting of ZnS, $ZnSO_4$, ZnO, $ZnCO_3$, MgS, $MgSO_4$ and $MgCO_3$.

In a preferred embodiment of the present invention, the A contains Zn in an amount of 0.002 to 1 atm %.

In a preferred embodiment of the present invention, the compound constituting the phosphor is heated at a relatively high temperature and the compound containing the A is heated at a relatively low temperature.

In a preferred embodiment of the present invention, the compound containing the phosphor has a compound containing the A incorporated therein, separately from the compound containing the A placed upstream.

In a preferred embodiment of the present invention, a material for generating the S or O is gaseous and the compound constituting the phosphor is subject to calcination for nitriding in an atmosphere in which the gaseous material is added to the ammonia gas.

In a preferred embodiment of the present invention, gas containing S is selected from the group consisting of $H_2S$ and $SO_2$.

In a preferred embodiment of the present invention, gas containing O is selected from the group consisting of $O_2$, $O_3$, $N_2O$, NO, air, $H_2O$, $CO_2$ and CO.

Also, in accordance with the present invention, a method for preparing a gallium nitride phosphor is provided. The method includes the steps of placing a compound constituting the gallium nitride phosphor in a calcination oven and flowing gas selected from the group consisting of gas containing S and that containing O, and ammonia gas separately from each other in the calcination oven.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

In order to solve the above-described problems of the prior art, the inventors considered that it is required to carry out crystallization of GaN while restraining decomposition thereof and fully carry out diffusion of dopant. For this purpose, it is required to carry out crystallization of GaN at an elevated temperature while restraining a reducing action of hydrogen and concurrently proceed doping of the dopant with increased efficiency at the elevated temperature.

Figure 1:
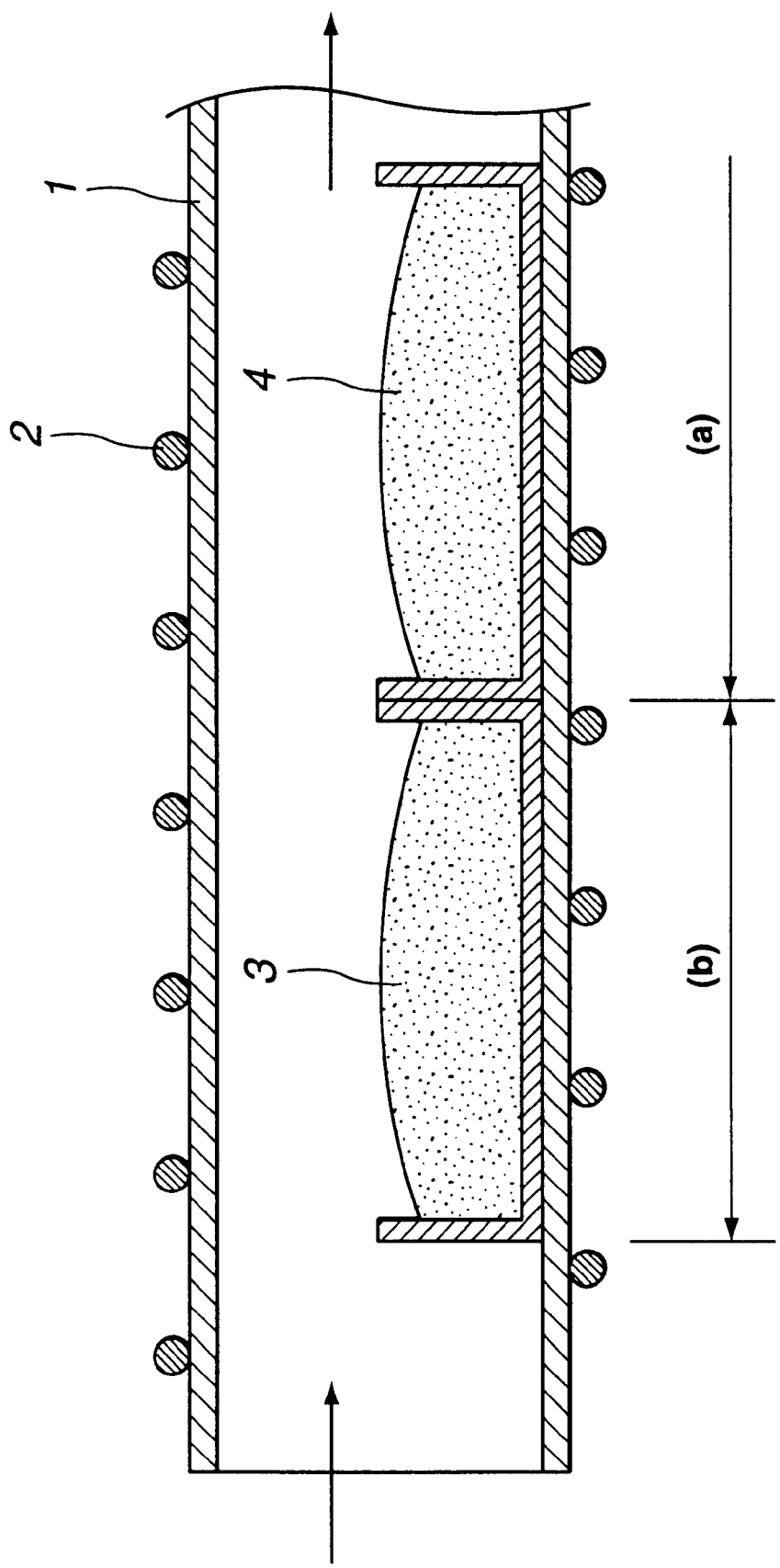
FIG. 1 is a sectional view showing a tubular oven suitable for use in the present invention by way of example.

More particularly, a tubular oven 1 shown in FIG. 1 is used as a calcination oven. The tubular oven 1 has a heater 2 spirally wound therearound so as to act as a heating means, to thereby permit an interior of the tubular oven 1 to be set at a desired temperature. Such arrangement causes a central section (a) in a heating region of the tubular oven 1 on which the heater 2 is wound to be relatively increased in temperature and an end section (b) in the heating region thereof to be relatively reduced in temperature. The tubular oven 1 is provided at both ends thereof with a gas inlet port and a gas outlet port, respectively, to thereby permit required gas to be flowed from the gas inlet port (on an upstream side) toward the gas outlet port (on a downstream side), as indicated at arrows in FIG. 1.

The calcination oven 1 is provided therein with a compound 3 for a doping material or dopant (hereinafter also referred to as "dopant compound") in a manner to be positioned in the end section (b) of the heating region on the upstream side. The dopant compound 3 contains a S or O element reacted with $H_2$ and is gasified by heating. A Ga compound which is a feed material or starting material for a matrix of the GaN phosphor is placed in the central section (a) of the heating region on the downstream side. The heater 2 is driven to heat the interior of the tubular oven 1 while flowing $NH_3$ through the tubular oven 1. This permits the dopant compound 3 to be heated at a relatively low temperature and the Ga compound 4 to be heated at a relatively high temperature.

The ammonia causes decomposition and scattering of the dopant compound 3, so that an atmosphere containing S, O and the dopant may be produced in proximity to the Ga compound. This results in S and O restraining a reducing action of hydrogen around the Ga compound 4, to thereby render decomposition of GaN hard, so that the relatively high calcination temperature described above does not adversely affect the process of the illustrated embodiment. Also, the Ga compound 4 is surrounded with the dopant which is rendered gaseous together with ammonia, so that the dopant in a sufficient amount may be diffused into GaN produced. Thus, an increase in calcination temperature leads to production of the GaN phosphor which is increased in crystallizability and fully doped with the dopant. Therefore, it will be noted that the GaN phosphor thus prepared exhibits luminance increased to a degree sufficient to permit the phosphor to be practically used.

As can be seen from the foregoing, the method of the present invention is so constructed that the dopant compound containing the elements reacted with $H_2$ and gasified by heating is arranged on the upstream side in the calcination oven in which $NH_3$ is flowed and the matrix element compound is arranged on the downstream side therein, resulting in the calcination being carried out. Such construction exhibits significant advantages.

More particularly, such construction permits GaN to be surrounded with ammonia and the dopant during the calcination, so that the GaN phosphor may be fully doped with the dopant.

Also, it permits GaN to be surrounded with S and/or O during preparation of GaN, to thereby render decomposition of GaN hard, leading to an increase in calcination temperature. This results in crystallization of GaN being promoted to provide the phosphor with increased crystallizability, so that the phosphor may exhibit enhanced luminance.

Also, in the present invention, the starting material for the GaN phosphor is subject to calcination in an atmosphere in which the S and/or O-containing gas and $NH_3$ are mixed. Such calcination renders blackening of GaN due to decomposition thereof hard during preparation of GaN. This promotes crystallization of GaN, to thereby provide the phosphor with enhanced crystallizability while rendering a color thereof lightened. Thus, the GaN phosphor can exhibit increased luminance intensity.

The invention will be understood more readily with reference to the following examples; however, these examples are intended to illustrate the invention and are not to be construed to limit the scope of the invention.

EXAMPLE 1

Preparation of GaN:Zn Phosphor $Ga_2O_3$ was used as the starting material (matrix element compound) for Ga. ZnS was used as the starting material for Zn which is the dopant. More specifically, 3 g $Ga_2O_3$ and 0.6 g ZnS were fully mixed with each other and then placed on a calcination boat. Also, ZnS (dopant compound 3) was placed on the upstream side in the tubular oven 1 in such a manner as shown in FIG. 1. At this time, the starting material 4 for Ga was placed in a uniformly heated zone or a zone heated to a predetermined temperature which is the substantially central section (a) of the heating region in the tubular oven 1. ZnS (dopant compound 3) was placed in the end section (b) of the heating region reduced in temperature as compared with the uniformly heated zone because it is readily scattered in the reducing atmosphere. This permits scattering of ZnS to be continued during calcination. Under such conditions, ammonia was flowed at a rate of 350 ml/min, during which the starting material for Ga is calcined at 1550° C. for 2 hours, to thereby prepare a GaN phosphor.

The thus-prepared GaN phosphor was applied to an anode substrate of a VFD and driven at an anode voltage of 30V for evaluation of luminescence. Also, it was coated on an anode substrate of an FED and driven at an anode voltage of 400V for luminescence evaluation.

Figure 2:
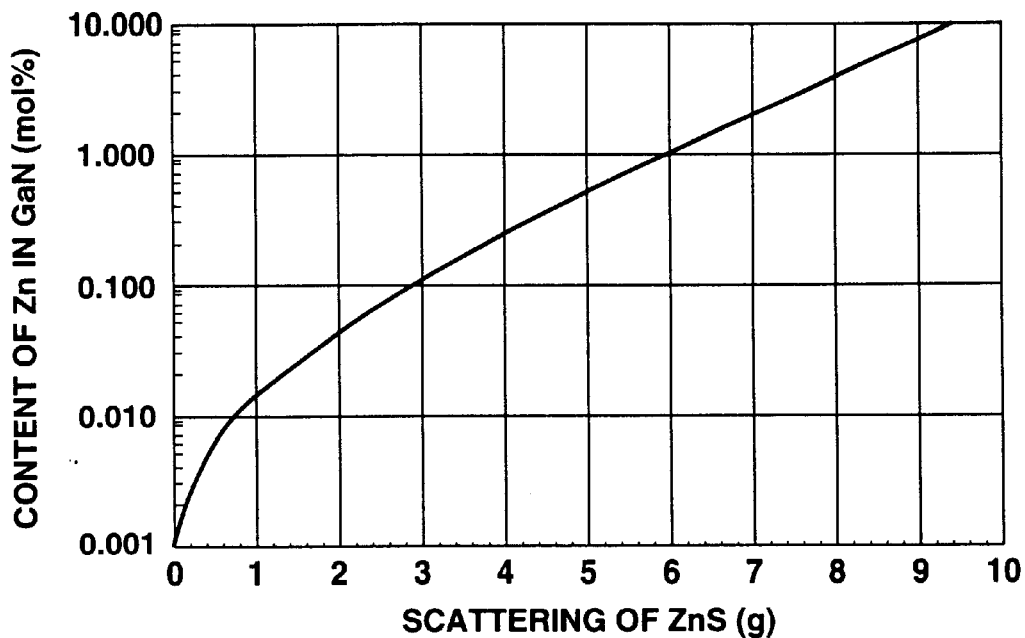
FIG. 2 is a graphical representation showing scattering of ZnS and a content of Zn in GaN in the present invention.

It was detected that the GaN phosphor was fully doped with the dopant. FIG. 2 shows relationship between the amount of scattering of ZnS and the amount or content of dopant (Zn) in the GaN phosphor. It was found that the amount of dopant in the GaN phosphor may be controlled by varying the amount of scattering of ZnS on the upstream side of the GaN gas in the calcination oven.

Figure 3:
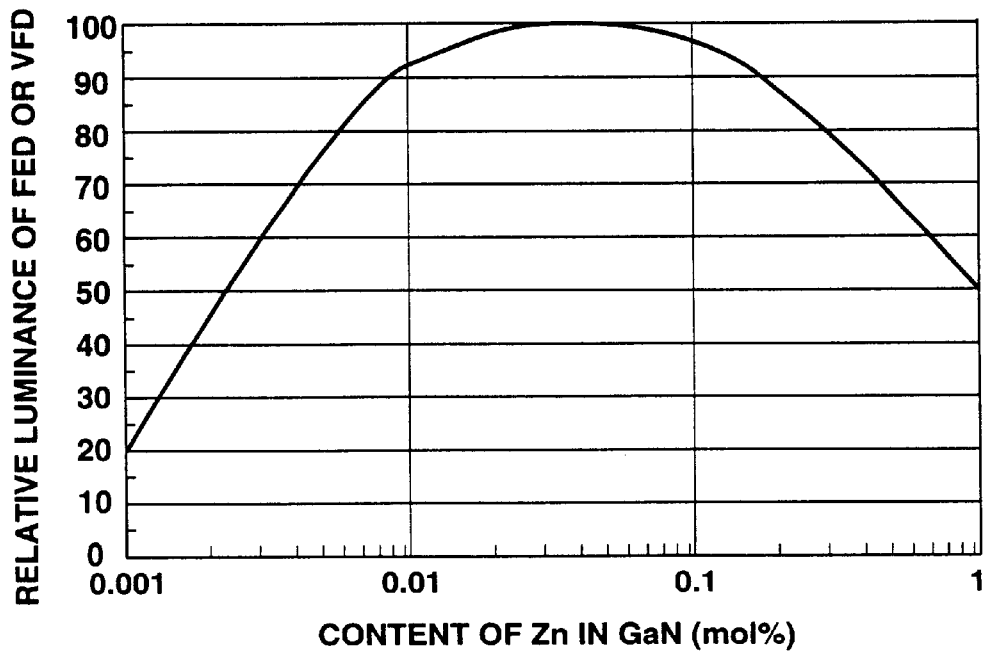
FIG. 3 is a graphical representation showing a content of Zn in GaN and relative luminance of FED/VFD in the present invention.
Figure 4:
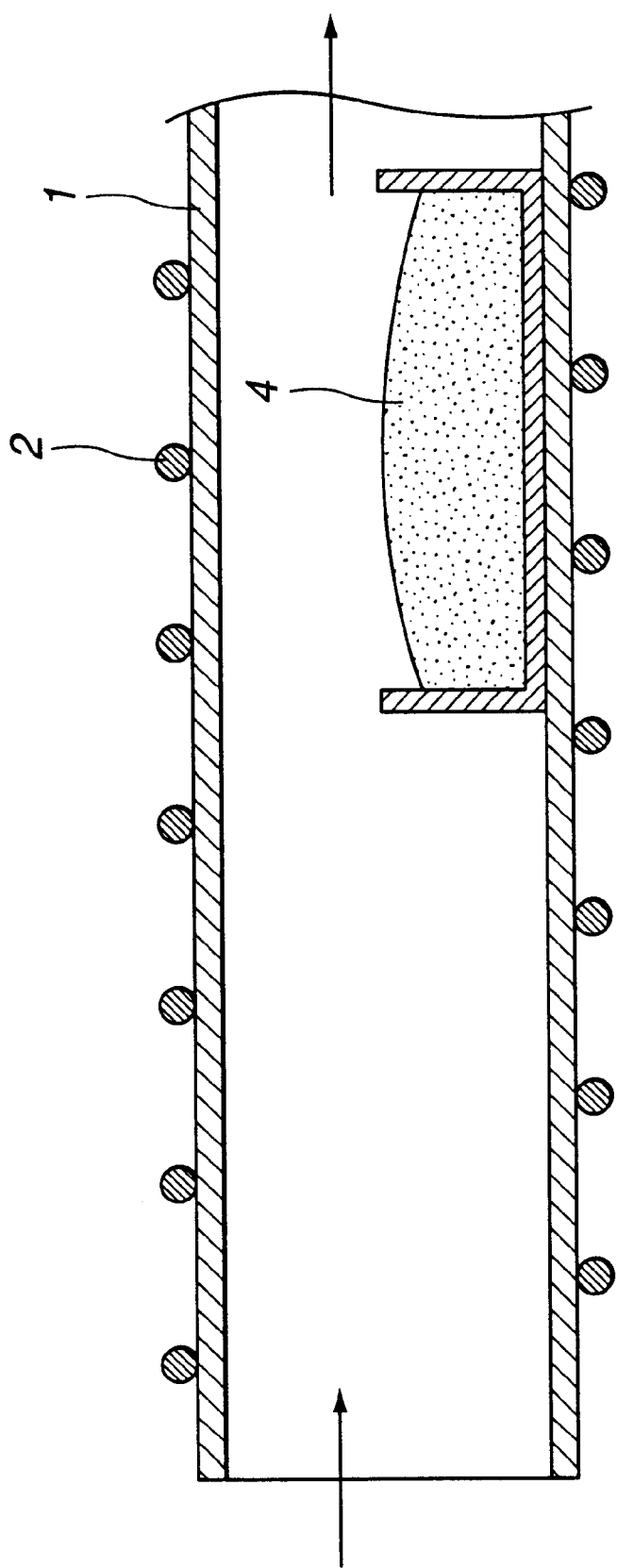
FIG. 4 is a sectional view showing another example of a tubular oven suitable for use in the present invention.

FIG. 3 shows relationship between the amount of Zn in GaN and luminance of the phosphor. It was found that a Zn concentration of 0.002% or more is required to permit the phosphor to exhibit enhanced luminance. Also, it was found that when ZnS is not scattered in the calcination oven, Zn fails to be doped in the GaN as indicated by 0 mol on an axis of abscissas in FIG. 2, resulting in the phosphor failing to exhibit increased luminance as seen from an axis of ordinates. It was found that Zn is preferably doped in an amount within a range between 0.002% and 1%.

EXAMPLE 2

Preparation of GaInN:Mg Phosphor 2 g of $Ga_2S_3$ which is the matrix element compound, 1 g of $In_2S_3$ which is the matrix element compound, 0.4 g of MgS which is the dopant compound were fully mixed together to prepare a mixture and then put on a calcination boat. Then, the mixture containing the matrix element compounds and the like and a dopant compound MgS were placed in the tubular oven 1 as in Example 1. Then, ammonia was flowed at a rate of 350 ml/min, during which the mixture was subject to calcination for 3 hours while keeping the uniformly heating zone at 1100° C., to thereby prepare a GaInN:Mg phosphor. It was confirmed that Mg is fully diffused in the GaInN phosphor. The phosphor was mounted in a VFD or an FED for luminescence evaluation as in Example 1. It emitted light of a green luminous color.

EXAMPLE 3

Example 3 revealed that use of a material selected from the group consisting of ZnO, $ZnSO_4$, $ZnCO_3$, $MgSO_4$ and $MgCO_3$ as the dopant compound S or O permits a phosphor to exhibit substantially the same function and advantage as in Examples 1 and 2 described above. It was found that ZnO, $ZnSO_4$, $ZnCO_3$, $MgSO_4$ and $MgCO_3$ each tend to be decomposed and scattered in the reducing atmosphere, so that it is required to place it in a region of a temperature lowered as compared with that of the region in which ZnS is placed.

EXAMPLE 4

Preparation of GaN:Zn,Si Phosphor 2 g of $Ga_2S_3$ for Ga, 0.4 g of ZnS for Zn and 0.0003 g of $SiO_2$ for Si were fully mixed together to prepare a mixture acting as the starting material, which was put on a calcination boat. Then, the mixture containing the matrix element compound and the like was placed in the central section of the tubular oven as in Example 1, and ZnS for the dopant compound was placed on an upstream side of the mixture. Ammonia was flowed in the oven at a rate of 350 ml/min, during which the mixture was subject to calcination at 1150° C. for 2 hours, to thereby obtain a GaN:Z,Si phosphor. It was confirmed that Zn and Si are fully diffused in the GaN:Zn,Si phosphor. Also, the phosphor was mounted in a VFD or an FED for luminescence evaluation as in Example 1. It emitted light of a blue luminous color.

EXAMPLE 5

Preparation of GaInN:Zn,Ge Phosphor 2 g of $Ga_2S_3$ for Ga, Ig of $In_2S_3$, 0.4 g of ZnS for Zn and 0.0005 g of $GeO_2$ for Ge were fully mixed together to prepare a mixture as the starting material, which was put on a calcination boat. Then, the mixture containing the matrix element compound and the like was placed in the central section of the tubular oven as in Example 1 and ZnS for the dopant compound was placed on a side upstream of the mixture. Ammonia was flowed in the oven at a rate of 350 ml/min, during which the mixture was subject to calcination at 1100° C. for 3 hours, to thereby obtain a GaInN:Zn,Ge phosphor. It was confirmed that Zn and Ge are fully diffused in the GaInN:Zn,Ge phosphor. Also, the phosphor was mounted in a VFD or an FED for luminescence evaluation as in Example 1. It emitted light of a green luminous color.

As a result of the inventors' study, it was found that the blackening phenomenon described above is due to precipitation of metal Ga. More particularly, GaN produced due to nitriding of the starting material such as a Ga oxide or the like is reduced by hydrogen gas produced by decomposition of ammonia, leading to liberation of metal Ga. It was found that in order to solve the problem that the GaN is blackened, to thereby improve crystallizability of GaN, it is required to carry out crystallization of GaN while restraining decomposition of GaN by reduction.

For this purpose, the tubular oven 1 shown in FIG. 1 was used as the calcination oven. The tubular oven 1 had the heater 2 spirally wound thereon so as to act as the heating means, to thereby permit the interior in the tubular oven 1 to be set at any desired temperature. The tubular oven 1 was rendered open at both ends thereof, to thereby permit gas required for the reaction to be flowed from one end (upstream end) thereof to the other end (downstream end) thereof.

The starting material for the GaN phosphor was placed in the calcination oven 1. Gas containing S and/or O was flowed together with ammonia in the calcination oven 1. This caused an atmosphere containing S and/or O to be produced near the starting material 4, resulting in a reducing action of hydrogen present near the starting material 4 being restrained to render decomposition of the GaN obtained hard, to thereby prevent blackening of the phosphor by decomposition thereof due to an increase in calcination temperature. This permitted the calcination to be increased to provide the GaN phosphor with increased crystallizability, so that the phosphor might exhibit enhanced luminance.

Alternatively, a material produced from the gas containing S and/or O by heating was previously mixed with the starting material 4 for the GaN phosphor placed in the calcination oven 1. Calcination of the material 4 in the calcination oven 1 led to production of the S and/or O-containing atmosphere around the starting material, resulting in substantially the same function and advantage as described above being exhibited.

EXAMPLE 6

Production of GaN:Zn Phosphor

A starting material for the matrix and that for the dopant were used as a starting material for the phosphor. $Ga_2O_3$ was used as the starting material for the matrix. ZnS was used as the starting material for the dopant. More specifically, 3 g $Ga_2O_3$ and 0.6 g ZnS were mixed with each other to prepare a mixture, which was then put on a calcination boat. The calcination boat was inserted into the tubular oven and ammonia was flowed at a rate of 350 ml/min in the tubular oven while being mixed with $H_2S$ flowed at a rate of 5 ml/min, to thereby subject the starting material for the phosphor to calcination at 1150° C. for 2 hours, resulting in the phosphor being obtained.

Then, the thus-obtained phosphor was subject to X-ray diffraction, so that crystallizability of the phosphor was evaluated on the basis of an integrated width value of a diffraction peak thereof. An reduction in integrated value of the diffraction peak indicates an increase in crystallizability. Also, the phosphor was coated on an anode substrate of a VFD and driven at an anode voltage of 400V for luminescence evaluation.

Figure 5:
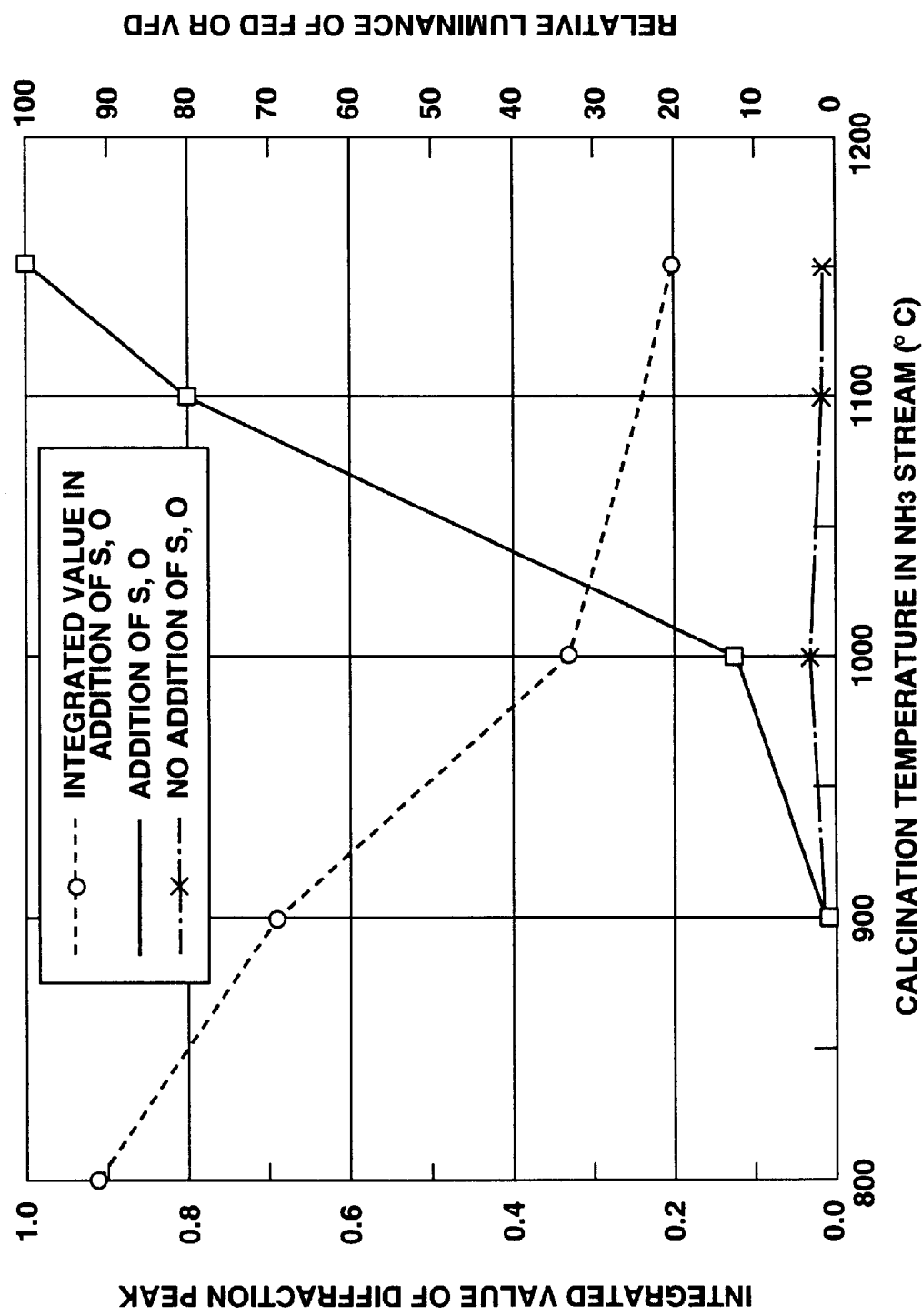
FIG. 5 is a graphical representation showing relationship of crystallizability of GaN and relative luminance of FED/VFD to a calcination temperature of GaN in the present invention. DETAILED DESCRIPTION OF THE PREFERRED EMBODIMENT Now, the present invention will be described with reference to the accompanying drawings.

FIG. 5 shows relationship between the calcination temperature and crystallizability or relative luminance of the VFD/FED.

A decrease in integrated value of the diffraction peak indicates that crystallizability of the phosphor is enhanced. In the example, addition of the gas containing S and/or O prevented blackening of the phosphor, to thereby permit the phosphor to be prepared while increasing the calcination temperature to a level as high as 1000° C. This realized that the integrated value of the X-ray diffraction peak is reduced to a level as low as 0.30 or less ($2\theta=37°$) as shown in FIG. 5.

When the gas containing S and/or O was not added to the reaction system, the phosphor was blackened due to decomposition of GaN at 1000° C. or more. The phosphor failed to exhibit satisfactory luminance due to blackening of GaN. Addition of the S and/or O-containing gas prevented blackening of GaN, so that the phosphor was increased in luminance with an increase in calcination temperature as shown in FIG. 2. In particular, the calcination temperature beyond 1000° C. permitted a relative value of luminance of the VFD/FED to be drastically increased.

The GaN phosphor had a brown color when it is reduced in crystallizability and was lightened with an increase in crystallizability. It had spectral reflectance of 60% at 450 nm in a blue region when it was calcined at 1100° C. However, when the S and/or O-containing gas was not added, it had spectral reflectance as low as 20%.

EXAMPLE 7

Preparation of GaInN:Mg Phosphor 2 g $Ga_2S_3$, 1 g $In_2S_3$ and 0.4 g $MgCl_2$ were fully mixed with each other to prepare a mixture and then placed on a calcination boat. Then, the boat was placed in the tubular oven as in Example 1. Then, ammonia was flowed at a rate of 350 ml/min in the oven and concurrently $N_2O$ was flowed at a rate of 20 ml/min therein, during which the mixture was subject to calcination at 1100° C. for 3 hours, to thereby prepare a GaInN:Mg phosphor. The phosphor was not blackened. The phosphor was mounted in a VFD or an FED for luminescence evaluation as in Example 1. It emitted light of a green luminous color.

EXAMPLE 8

Example 7 was substantially repeated except that $SO_2$ gas rather than $N_2O$ was flowed at a rate of 5 ml/min in the calcination oven. Substantially the same results as those of Example 2 were obtained.

EXAMPLE 9

Example 7 was substantially repeated except that $SO_2$ gas rather than $N_2O$ was flowed at a rate of 5 ml/min in the calcination oven. Substantially the same results as those of Example 2 were obtained.

EXAMPLE 10

Example 7 was substantially repeated except that each of $O_2$, $O_3$, NO, air, $H_2O$ and CO rather than $N_2O$ was flowed at a rate of 5 ml/min in the calcination oven. Substantially the same results as those of Example 7 were obtained. The gases may be used individually or in combination.

EXAMPLE 11

Example 2 was substantially repeated except that addition of a powder of S to the starting material was carried out in place of flowing of $N_2O$ gas. The S was gasified during calcination of the starting material. Substantially the same results as those of Example 2 were obtained.

While the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method for preparing a gallium nitride phosphor represented by a formula $Ga_{1-x}In_xN:A,B$ ($0 \leq x < 1$, A=Zn or Mg, B=Si or Ge), comprising the steps of:

placing a Ga compound constituting the gallium nitride phosphor in a first heating zone of a calcination oven;

generating oxygen or sulphur gas in a second heating zone of the calcination oven;

flowing ammonia gas from the second heating zone to the first heating zone of the calcination oven, thereby to decompose the ammonia gas into nitrogen to be reacted with gallium in the Ga compound and hydrogen to be reacted with the oxygen or sulphur gas generated in the second heating zone; and subjecting the Ga compound to calcination in an atmosphere containing nitrogen, hydrogen and oxygen or sulphur to nitride gallium and dope the gallium nitride with the element A or B of the formula.

2. A method as defined in claim 1, wherein the oxygen or sulphur gas is generated from a compound containing element A, and said compound is placed upstream of the Ga compound constituting the gallium nitride phosphor to nitride said Ga compound by calcination.

3. A method as defined in claim 2, wherein said compound containing element A is selected from the group consisting of ZnS, $ZnSO_4$, ZnO, $ZnCO_3$, MgS, $MgSO_4$ and $MgCO_3$.

4. A method as defined in claim 1, wherein element A is Zn in an amount of 0.002 to 1 atm %.

5. A method as defined in claim 1, wherein said Ga compound constituting the gallium nitride phosphor is heated at a relatively high temperature and said compound containing O or S is heated at a relatively low temperature.

6. A method as defined in claim 1, wherein the Ga compound constituting the gallium nitride phosphor contains element A.

7. A method as defined in claim 1, wherein the oxygen or sulphur gas is generated from a gaseous compound.

8. A method as defined in claim 7, wherein the gaseous compound containing sulphur is selected from the group consisting of $H_2S$ and $SO_2$.

9. A method as defined in claim 7, wherein the gaseous compound containing oxygen is selected from the group consisting of $O_2$, $O_3$, $N_2O$, NO, air, $H_2O$, $Co_2$ and CO.

10. A method for preparing a gallium nitride phosphor comprising the steps of:

placing a Ga compound constituting the gallium nitride phosphor in a calcination oven;

flowing gas selected from the group consisting of gas containing S and gas containing O in the calcination oven;

flowing ammonia gas into the calcination oven separate from the gas containing S and the gas containing O, thereby to decompose the ammonia gas into nitrogen to be reacted with gallium in the Ga compound and hydrogen to be reacted with the gas containing S or the gas containing O; and subjecting the Ga compound to calcination in an atmosphere containing nitrogen, hydrogen, and sulphur or oxygen to nitride gallium.

\* \* \* \* \*